Figure 1:
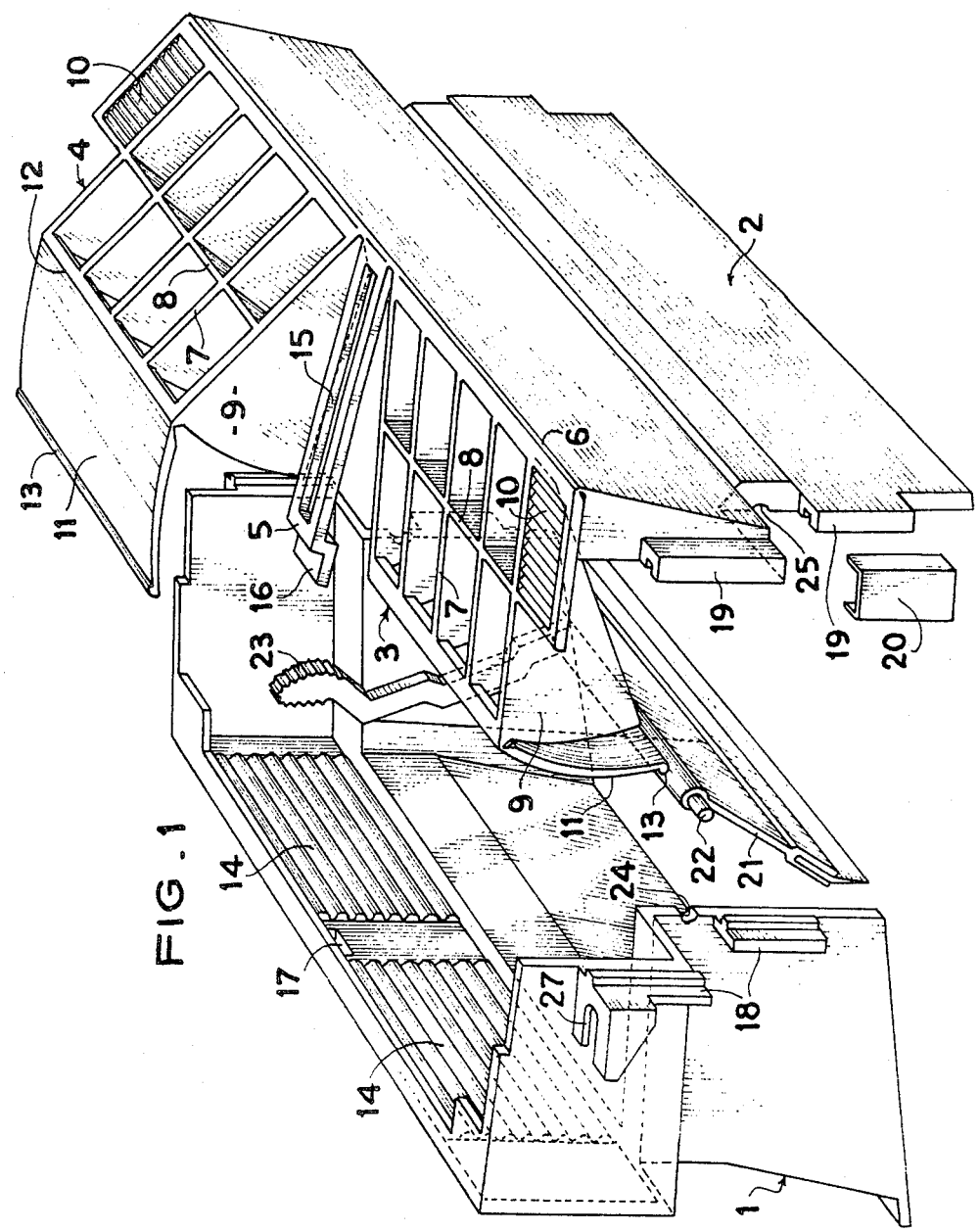

United States Patent [19]
Condet et al.

[11] 3,921,507
[45] Nov. 25, 1975

[54] AIR DISTRIBUTING OUTLET STRUCTURE IN PARTICULAR FOR AUTOMOBILE VEHICLES

[75] Inventors: Claude Condet, Rueil-Malmaison; Francois Verdière, Suresnes, both of France

[73] Assignee: Automobiles Peugeot, Paris, France

[22] Filed: Sept. 12, 1974

[21] Appl. No.: 505,458

[30] Foreign Application Priority Data
Sept. 19, 1973  France .............................. 73.33631

[52] U.S. Cl. ...................... 98/2; 98/40 C; 98/121 R; 49/74; 98/114
[51] Int. Cl.² .......................................... B60H 1/00
[58] Field of Search ...... 98/114, 40 C, 40 V, 121 R, 98/2.05, 108, 106, 2; 29/157 R; 49/74, 371; 312/257 SM, 236; 220/4 R, 4 F

[56] References Cited
UNITED STATES PATENTS
2,853,935  9/1958  Crowle et al. .................... 98/94 AC
2,902,919  9/1959  Waalkes et al. ...................... 98/108
3,182,579  5/1965  Wiseman ........................... 98/40 V
3,264,971  8/1966  Dangauthier ........................... 98/2
3,730,074  5/1973  Helwig ............................ 98/121 R

*Primary Examiner*—John J. Camby
*Assistant Examiner*—Henry C. Yuen
*Attorney, Agent, or Firm*—Burns, Doane, Swecker & Mathis

[57] ABSTRACT

The air distributing outlet structure comprises a plastics duct and at least one orientable plastics grill which is in one piece with a first of the side walls of the duct, it being connected to the side wall by a thinned-down line constituting a hinge. A tab is in one piece with the grill and is connected to the latter by a thinned-down line constituting a hinge. The tab has an end portion which cooperates with recesses in the inner surface of a second side wall of the duct opposite the first side wall for setting the orientation of the grill.

5 Claims, 3 Drawing Figures

U.S. Patent Nov. 25, 1975 Sheet 2 of 2 3,921,507
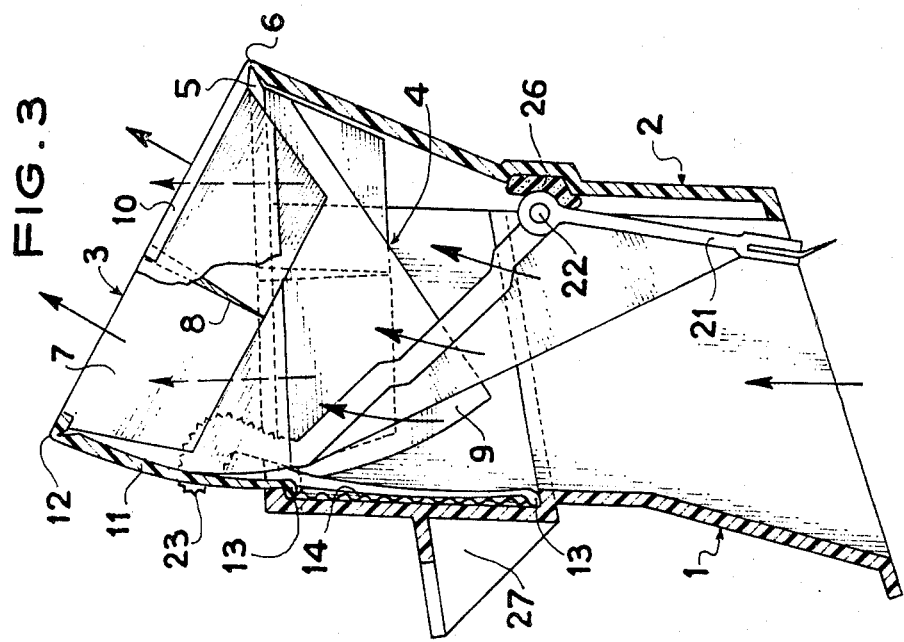
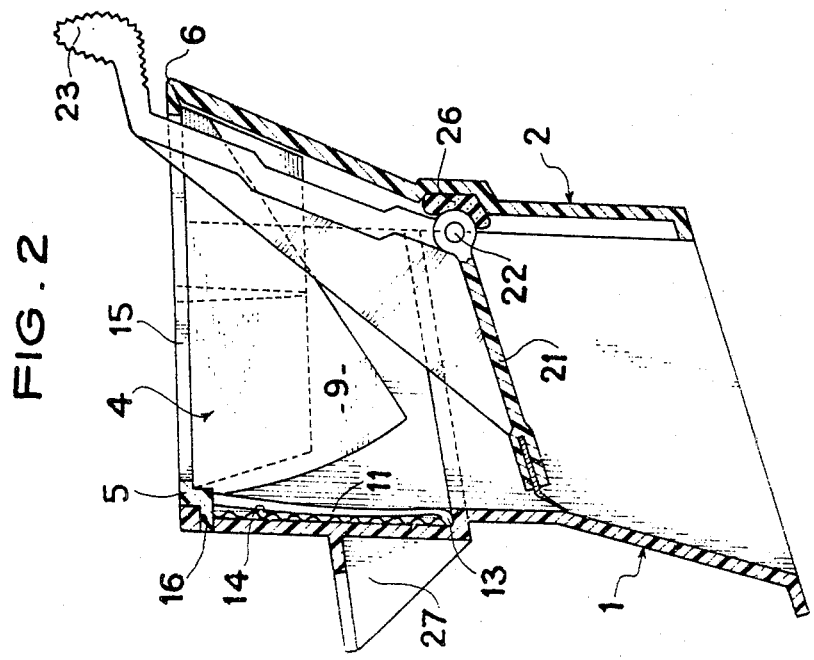

AIR DISTRIBUTING OUTLET STRUCTURE IN PARTICULAR FOR AUTOMOBILE VEHICLES

The present invention relates to an air distributing outlet structure and concerns more particularly the outlet disposed on the dashboard of a vehicle through which air, which may cooled or heated, is introduced inside the passenger compartment.

It is of interest for this use to have orientable outlets so as to modify in accordance with the wishes of the users, the direction of the stream of air issuing from the duct, and usually there is employed for this purpose outlets which are pivotable in a fixed housing. One distribution outlet structure of this type is described, for example, in French Pat. No. 1,366,130.

An object of the invention is to provide a distributing outlet structure with particularly simple means greatly facilitating the manufacture and assembly of the outlet structure and consequently considerably reducing its price.

According to the invention there is provided an air distributing outlet structure comprising at least one orientable grill disposed at the end of a fixed duct, wherein the grill is composed of plastics material and in one piece with one of the side walls of the fixed duct to which it is connected by a thinned-down line constituting a hinge and with a tab to which it is also connected by a thinned-down line constituting a hinge, said tab having an end portion capable of cooperating with recesses formed on the inner surface of a side wall of the fixed duct opposed to the side wall which is in one piece with the grill.

Further features and advantages of the invention and its operation will be described hereinafter with reference to the accompanying drawings given by way of example and in which:

FIG. 1 is an exploded perspective view of a distributing outlet structure according to the invention;

FIG. 2 is a cross-sectional view of the outlet structure according to the invention in a plane perpendicular to the large side walls of the outlet structure and passing through the middle of said side walls, and FIG. 3 is a cross-sectional view of the outlet structure according to the invention in a plane perpendicular to the large side walls of the outlet structure, the parts of the large side walls occupying positions which are different from those shown in FIG. 2.

In the illustrated embodiment, the end portion of an air supply duct in the passenger compartment of an automobile vehicle comprises a front half-housing 1 forming approximately two of the side walls of the duct and a rear half-housing 2 constituting the fourth side wall.

The rear half-housing 2 is of plastics material and integral with two grills 3, 4 disposed on each side of a centre tongue portion 5. The grills 3, 4 and the tongue portion 5 are connected to the half-housing 2 by a thinned-down portion, i.e., a portion of reduced thickness, 6 constituting a hinge.

Each grill 3, 4 has orthogonal fins 7, 8 and is defined by side walls 9. It also has a lateral extension 10 disposed on one side outside the end of the side wall 9 and constituting a shifting lug.

From the side opposed to the hinge 6 each grill 3, 4 is extended by a tab 11 to which it is also connected by a thinned-down portion 12 constituting a hinge. The tabs 11 terminate in a flange or ledge 13 which is adapted to cooperate with recesses or grooves 14 formed in the inner surface of the side wall of the half-housing 1 opposed to the half-housing 2.

The tongue portion 5 has a slot 15 and terminates in a finger portion 16 adapted to engage in an aperture 17 in the half-housing 1.

The half-housing 1 and 2 comprises laterally along their plane of assembly respective lugs 18, 19, fasteners 20 being adapted to be mounted by clipping on said tabs for assembling the two half-housings.

Inside the duct there is disposed a flap 21 provided with two pins or lugs 22 which constitute a pivot axis and are integral with a lever 23. The pins 22 engage in cavities 24, 25 formed in face-to-face relation in the half-housings 1 and 2. The lever 23 is engaged in the slot 15 of the tongue portion 5. A strip 26 of cellular plastics material is adhered to the inside of the half-housing 2 so as to afford a seal along the flap 21.

The whole of the structure is secured to the dashboard (not shown) of the vehicle by tabs 27 disposed outside the half-housing 1 (FIGS. 2 and 3).

It can be seen that the parts just described are extremely easy to construct. In particular, the assembly constituted by the half-housing 2, the grills 3, 4, the tongue portion 5 and the tabs 11, is moulded in the flat condition, which is most advantageous.

The assembly of the structure is also particularly simple. It is sufficient to bring the half-housings 1 and 2 together while trapping the pins 22 of the flap 21 in the cavities 24 and 25 and then place the assembling fasteners 20 in position. The tongue portion 5 is then folded over by engaging the finger portion 16 in the aperture 17 formed in the half-housing 1, and the grills 3, 4 are folded over by introducing the tabs 11 inside the half-housing 1.

When the tabs 11 are fully inserted (FIG. 2), the stream of air which issues through the grills 3, 4 is directed substantially vertically. When the tabs are raised, the stream of air is indicated by the arrows in FIG. 3 and is inclined toward the interior of the passenger compartment.

To raise a grill 3 or 4, it is sufficient to engage a finger under the corresponding lug 10 and exert a thrust in the upward direction. The grill is held in the selected position merely by elasticity, the hinges 6 and 7 always having a tendency to open.

Shifting the lever 22 forwardly and rearwardly rotates the flap 21 which closes the duct to a greater or less extent and thereby regulates the flow of air issuing from the outlet structure.

Having now described our invention what we claim as new and desire to secure by Letters Patent is:

1. An air distributing outlet structure, in particular for mounting in the dashboard of an automobile vehicle, comprising fixed duct having side walls, at least one orientable grill composed of plastics material and in one piece with a first of the side walls composed of plastics material of the fixed duct to which first side wall the grill is connected by a thinned-down line constituting a hinge, a tab composed of plastics material in one piece with the grill and connected to the grill by a thinned-down line constituting a hinge, the tab having an end portion, and recesses on an inner surface of a second side wall of the fixed duct opposed to the first side wall, the end portion of the tab being capable of cooperating with the recesses for regulating the orientation of the grill.

2. An air distributing outlet structure, in particular for mounting in the dashboard of an automobile vahicle, comprising a fixed duct having side walls, at least one orientable grill composed of plastics material and in one piece with a first of the side walls composed of plastics material of the fixed duct to which first side wall the grill is connected by a thinned-down line constituting a hinge, a tab composed of plastics material in one piece with the grill and connected to the grill by a thinned-down line constituting a hinge, the tab having an end portion, and recesses on an inner surface of a second side wall of the fixed duct opposed to the first side wall, the end portion of the tab being capable of cooperating with the recesses for regulating the orientation of the grill, the fixed duct comprising a first half-housing defining three of the side walls of the duct including said second side wall and a second half-housing defining said first side wall, and means assembling the half-housings.

3. An air distributing outlet structure, in particular for mounting in the dashboard of an automobile vehicle, comprising a fixed duct having a first half-housing and a second half-housing, means assembling the half-housings, the first half-housing defining three side walls of the duct and the second half-housing defining a fourth side wall of the duct, two orientable grills composed of plastics material and in one piece with said fourth side wall which is of plastic material, the grills being connected to said fourth side wall by a thinned-down line constituting a hinge, two tabs composed of plastics material respectively in one piece with the two grills, each tab being connected to its corresponding grill by a thinned-down line constituting a hinge, each tab having an end portion, recesses defined by an inner surface of one of said three side walls of the first half-housing which faces said fourth side wall, the end portions of the tabs being capable of cooperating with the recesses for regulating the orientations of the grills, a tongue portion of plastics material in one piece with said fourth side wall and connected to said fourth wall by a thinned-down line constituting a hinge, means defining an aperture in the first half-housing, the tongue portion having a free end at which free end there is provided a finger portion engaged in said aperture, the tongue portion defining a slot, adjustable air flow regulating flap means mounted within the duct, and a lever associated with the flap means for adjusting the position of the flap means and engaged in said slot.

4. An air distributing outlet structure as claimed in claim 1, wherein the grill comprises orthogonal fin portions and a lateral extension constituting means for swinging the grill about its hinge.

5. An air distributing outlet structure as claimed in claim 3, wherein the grills comprise orthogonal fin portions and a lateral extention constituting means for swinging the grills about their hinges.

* * * * *